March 16, 1926. 1,577,416
A. W. BENNIS
COMPRESSED AIR FURNACE
Filed May 12, 1919 11 Sheets-Sheet 1

Fig.1.

March 16, 1926. 1,577,416
A. W. BENNIS
COMPRESSED AIR FURNACE
Filed May 12, 1919 11 Sheets-Sheet 2

A. W. BENNIS

COMPRESSED AIR FURNACE

Filed May 12, 1919 11 Sheets-Sheet 4

Witnesses
K. B. Hughes
C. V. Hughes

Inventor
Alfred W. Bennis
by Sturtevant & Mason
Attorneys

March 16, 1926.

A. W. BENNIS 1,577,416

COMPRESSED AIR FURNACE

Filed May 12, 1919 11 Sheets-Sheet 7

A. W. BENNIS

COMPRESSED AIR FURNACE

Filed May 12, 1919   11 Sheets-Sheet 10

Witnesses
H. B. Hughes
C. V. Hughes

Inventor
Alfred W. Bennis
by Sturtevant & Mason
Attorneys

March 16, 1926.

A. W. BENNIS 1,577,416

COMPRESSED AIR FURNACE

Filed May 12, 1919 11 Sheets-Sheet 11

Patented Mar. 16, 1926.

1,577,416

UNITED STATES PATENT OFFICE.

ALFRED WILLIAM BENNIS, OF BOLTON, ENGLAND.

COMPRESSED-AIR FURNACE.

Application filed May 12, 1919. Serial No. 296,632.

(GRANTED UNDER THE PROVISIONS OF THE ACT OF MARCH 3, 1921, 41 STAT. L., 1313.)

*To all whom it may concern:*

Be it known that I, ALFRED WILLIAM BENNIS, a subject of the King of Great Britain, residing at Bolton, in the county of Lancaster, in the Kingdom of England, have invented certain new and useful Improvements in Compressed-Air Furnaces (for which I have filed an application in Great Britain, September 5, 1917, Patent No. 166,163), of which the following is a specification.

This invention relates to improvements in automatic stokers, and more particularly to stoker or feeding devices together with other parts bearing a relation thereto which are used in conjunction with travelling chain grates or other furnaces having forced draught, balanced draught or the like.

When forced draught has hitherto been used with furnaces there has been a tendency, when the pressure of air used to force the air through the grate is greater than atmospheric pressure, or where there is a higher pressure of air in the furnace or in the combustion chamber than there is in the stoke hole or boiler room, for flames or hot gas to issue from the furnace or combustion chamber through every available crack or orifice through which they can penetrate, and when such cracks or orifices lead to the interior of the stoker, or between metal parts of the same, or to or around or between the furnace frame or other constructions supporting or carrying the stoker or furnace or adjacent thereto, damage is done to the stoker and other parts of the travelling chain grate. Another disadvantage is that the fuel being fed to the furnace tends to get on fire and this fire may creep up the fuel supply hoppers and often up the fuel shoots to the overhead bunkers in such cases where these are installed. Furthermore, the heat damages the front jamb columns of the stoker and other parts supporting or adjacent to the stoker and the air-sealing devices together with the stoker frames and parts at the sides of the furnace.

Mere air-cooling of the parts, by making them hollow and passing a current of air through them, is usually not sufficient to prevent these disadvantages, as it does not prevent the back draught blowing through between the adjacent parts.

The present invention is applicable to horizontal or inclined grates used in conjunction with forced draught or balanced draught or the like to remove the above disadvantages or may be used with natural draught grates to improve the lighting up capacity of the grate and to keep the parts cool. In the latter case the stoker and certain other parts will have independent air supply supplied under pressure. The air under pressure may be supplied by means of a fan or fans, steam jet blower or blowers or other well-known means.

One of the objects of this present invention is to obviate the hereinbefore mentioned disabilities present in existing constructions of chain grates for use with forced-draught, balanced draught or the like, and to supply means for creating a contra flow of fluid pressure to any cracks, orifices, or other places through which in existing constructions hot gas or flames tend to issue from the furnace or combustion chamber, to the detriment of the stoker or its relating parts.

Another object of the invention is to provide means for using for cooling and contra flow purposes, the air which leaks through from the forced or balanced draught air chambers at or near the front and back of the grate, such air being usually wasted in existing constructions.

The present invention is more particularly described with reference to the accompanying drawings in which:—

Figure 3 is a sectional side view through the wall at the side of the grate and through the hollow cill plate and supporting castings in the wall. It also shows exterior side view of front of frame of chain grate, together with sectional side view through stretcher plate, and stoker front plates.

Figure 2:
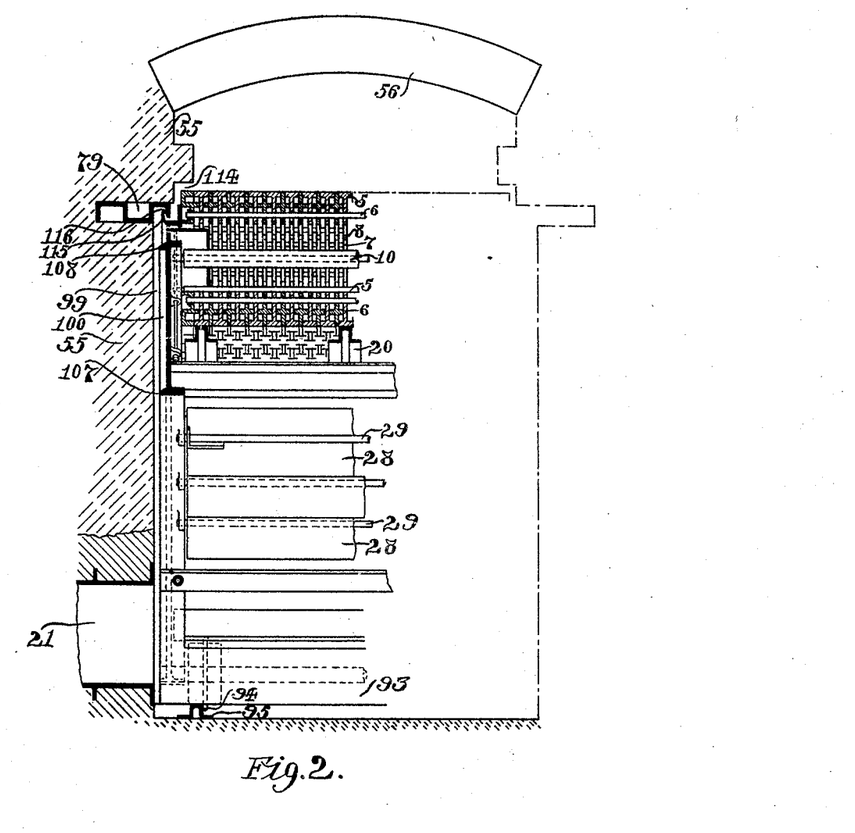
Figure 2 is a section of the same taken substantially on the line 2—2 of Fig. 1.
Figure 6:
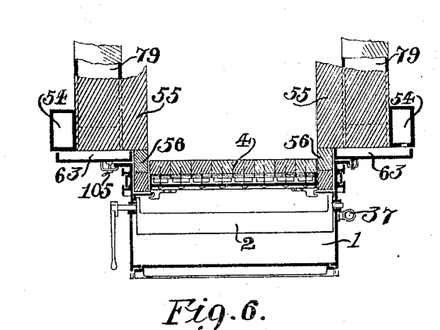
Figure 6 is a sectional plan through jamb columns and portions of walls at side of grate.
Figure 23:
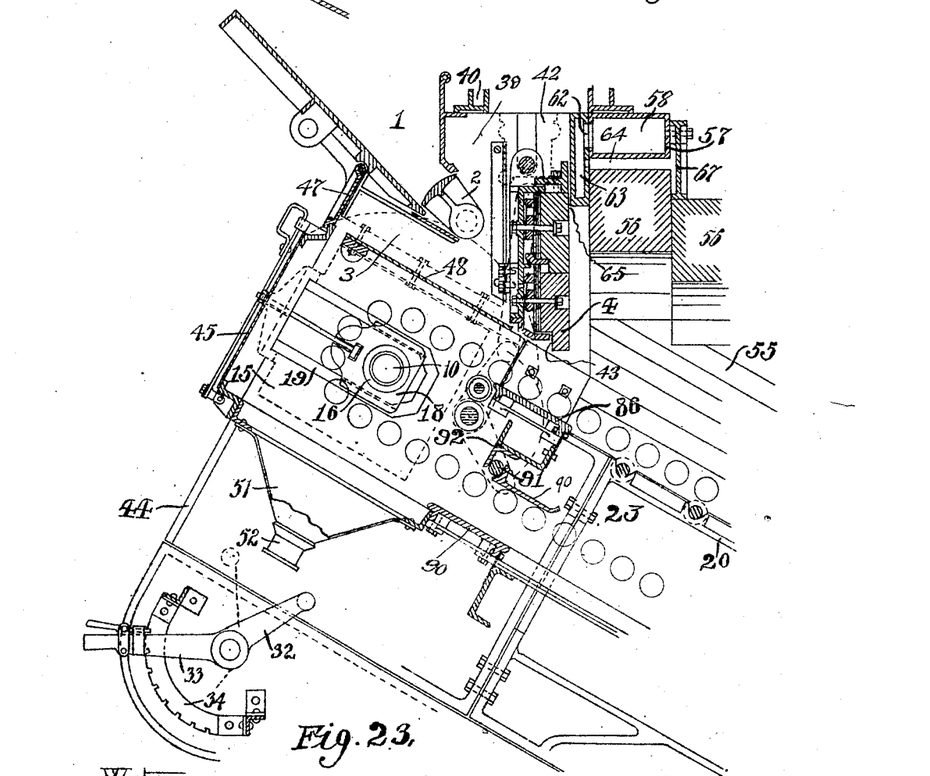
Fig. 23 is a detail sectional view of the stoker hopper, the fire door, and of certain parts of the front of the chain grate frame.

A simple form of furnace is shown in which the stoker has a fuel feed hopper 1, provided at its lower end with a cut-off gate 2 allowing the fuel to pass into the feed hopper lower extension 3 and the adjustable fire door 4 Figures 6 and 23 allows an even thickness of the fuel fed to the fire and the grate formed of the links 5 connected to link rods 6 and supported by front driving sprockets 7 having teeth 8 engaging the chain formed of the links 5 as seen in Fig. 2. The chain grate is at its opposite end supported by a sprocket 9. The sprocket 7 is carried on a shaft 10 (Figs. 1 and 11) to which is keyed a driving worm wheel 11 (Fig. 11) driven from a worm 12 on a main driving shaft 13, the gearing 11, 12 being enclosed in a casing 14 mounted on the grate frame 15.

Figure 10:
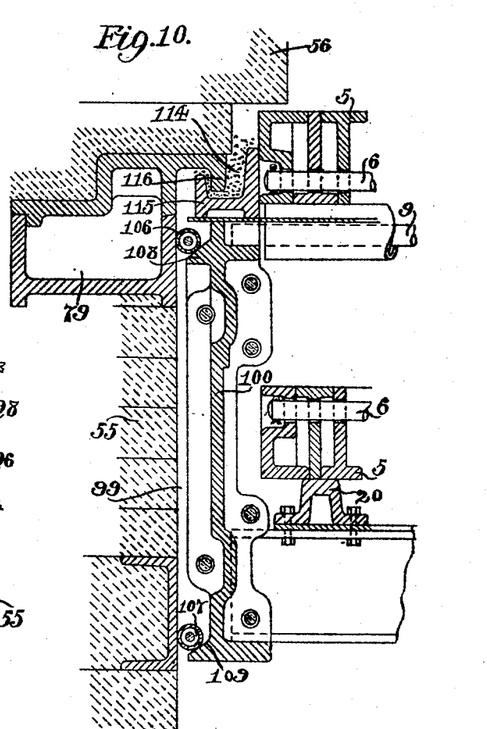
Figure 10 is a vertical cross section through metal side frame of grate in its relation to side wall structure of grate, air seals, sand seal and to the links of the grate.
Figure 11:
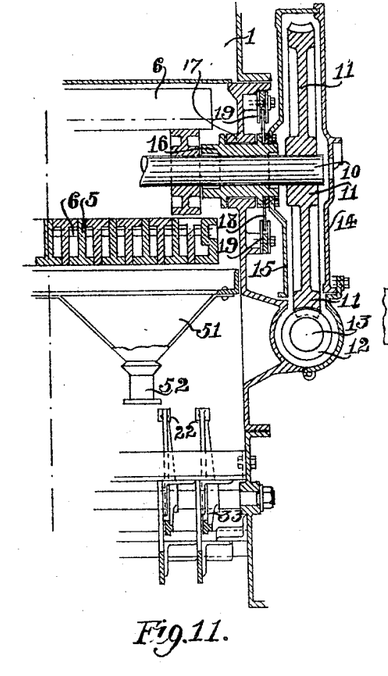
Figure 11 is a vertical section showing in part the driving gear of the grate in its relation to the metal side frame of the grate, shaft and sprocket.

The main shaft 10 (Figs. 11 and 23) is carried in bearings 16 sliding in guides 17 (Fig. 11) on the chain grate frame 15 so that the position of the bearing can be adjusted to adjust the tension of the chain grate as desired. The cut-away parts including the guides 17 are shielded to prevent air leakage by a plate 18 carried on a bearing 16 moving between the pair of plates 19, mounted on the frame 15. It is obvious of course that any desired alternative form of drive for the grate can be used. Rails 20 (Fig. 10) support the chain grate between the sprockets or drums on shafts 9 and 10.

Figure 1:
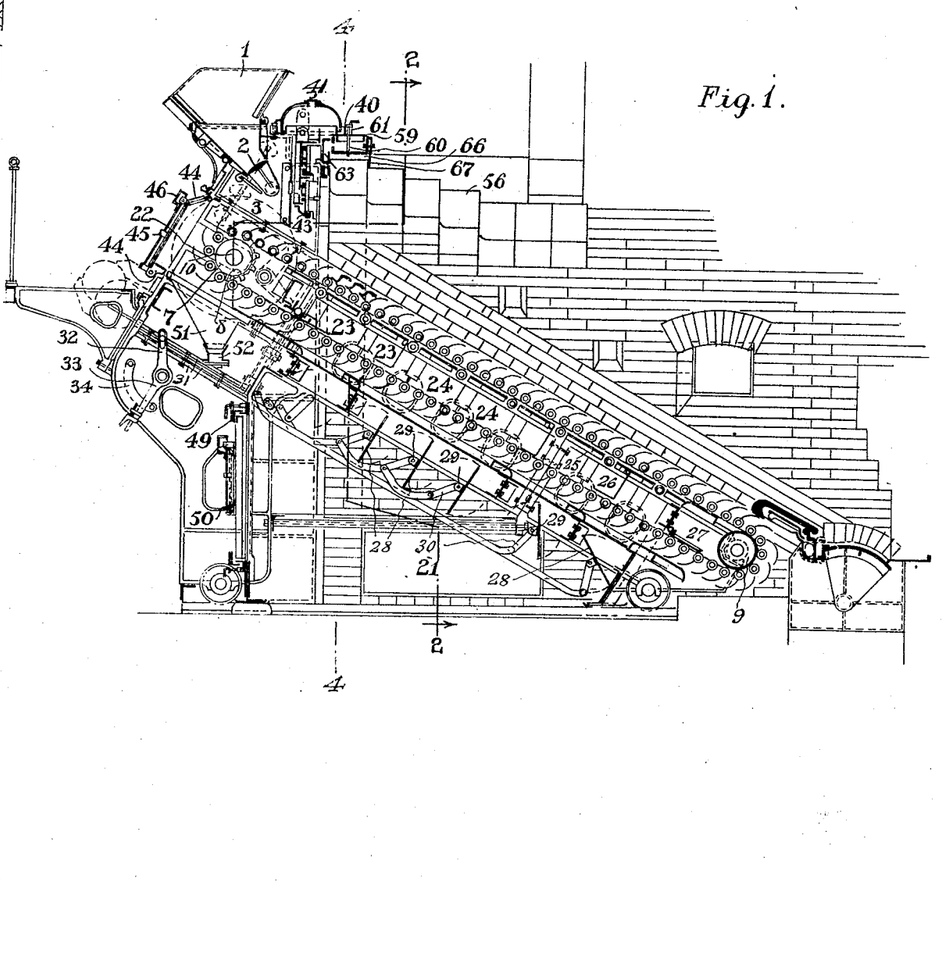
Figure 1 is a side view partly in section of an inclined chain grate stoker according to this invention, the links or fire bars being diagrammatic only.

The furnace is provided with a main air-trunk 21 (Figs. 1, 2 and 3) which is adapted to supply air necessary for combustion and for cooling purposes as hereinafter described. Air from the trunk 21 is passed to the air chamber 22 enclosing the front sprocket 7, to the chamber 23, the combustion chamber 24, to the front chamber 25, to the rear chamber 26, and to the rear sprocket air chamber 27. The supply of air to the chambers 23, 24, 25, 26 is controlled by dampers 28 mounted on spindles 29 and provided with operating arms 30 connected by rods 31 pivoted to the arms 32 and operating levers 33, movable over quadrants 34 so that the position of any of the dampers 28 can be adjusted as desired and consequently the pressure in any air-chamber of the furnace see Figs. 1 and 24.

Air from the front sprocket air chamber 22 is led through an opening 35 (Fig. 3) in the side frame by a duct 36 connecting by means of branch duct 37 with the housing round the upper part of the stoker and connecting by means of a branch duct 38 with the housing round the lower extension of the stoker hopper.

The chamber fed by the duct 37 is closed by a removable housing 39 (Fig. 3). This housing has flanged or other suitable joints, such as the sand or water seals 40, so that access can readily be obtained to the fire door 4 and other parts beneath it.

An adjustable relief valve 41 is provided on the housing so that air pressure in the interior of the stoker and its parts cannot rise beyond a predetermined maximum so as to avoid too rapid lighting up at the front of the grate when dealing with certain classes of fuel and to prevent undue leakage of air into the furnace which might also lower its efficiency. Air in this chamber can enter the hollow fire door 4 to cool the parts of it through an opening or openings for instance at its top, such as 42, (Fig. 23) and after passing along passages in the fire door 4 can pass out of an opening or openings 43 at its lower end, preferably just behind the brick or protective lining, this air being then delivered in a position suitable for promoting combustion and rapid lighting-up of the fire near to the entrance of the fuel to the fire.

The front section or sprocket chamber of the furnace is closed in by a housing 44 (Figs. 1 and 23) which has a door, movable plate, or its equivalent 45 secured by a locking device 46 for access to the front sprocket.

A door 47 or its equivalent is provided immediately below the fuel hopper for access to the lower extension chamber, separated from the sprocket chamber by the dead plate 48. The chamber 3 formed between the dead plate 48 and the fuel hopper 1 and having as a rear wall the fuel coming down past the valve 2 towards the fire is maintained under air pressure from air supplied by leakage from other parts or from the ducts 36 and 38 (Fig. 3) so that air passes from the chamber through the fuel effectively preventing any flow of heated gases in an opposite direction. Similarly the chamber 39 formed at the rear of the fuel hopper is fed with air under pressure from the chamber 3 or directly from the ducts 36 and 37 and from leakage from furnace parts adjacent to it so that air pressure is maintained above the fuel passing under the door 4 to percolate or flow through the fuel towards the fire from the upper side of the fuel stream.

A further door or the like 49 is provided for access to the main air chamber beneath the grate. This door may similarly be provided with a locking device 50, see Fig. 1.

The housing 44 is extended in its lower part in the form of a hopper 51 provided at or near the bottom with a gate or door 52 to enable small ashes or residue which drop from the chain grate links or fire bars 5 as they pass around the front drum or sprocket 7 to be withdrawn.

Figures 4, 5:
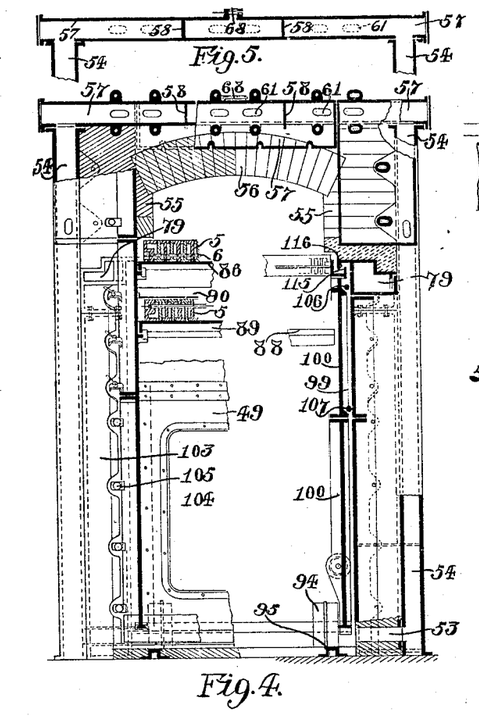
Figure 4 is a vertical section taken on the line 4—4 Fig. 1, and looking towards the front of the grate, the section being taken through various parts constituting the front and sides of the structure of the grate.
Figure 5 is a vertical section through the stretcher plate over the front of the grate.

Air from the main air chamber 22 below the grate fed from the trunk 21 is led through an opening 53 (Figs. 3, 4 and 9), which opening 53 leads to the jamb column or columns 54. These columns 54 abut against the vertical walls 55 of the furnace acting as a partial support for the arches of fire brick or other refractory material 56 carried by the walls 55. The jamb columns 54 are connected at their upper ends by means of stretcher plates 57 (Figs. 4 and 5) bolted or secured thereto which may similarly be provided with air guiding and cooling ribs 58 if desired. These stretcher plates 57 are preferably of channel section to form an air chamber enclosed by a plate top 59 (Fig. 1) secured to the stretcher plate 57 by means of bolts 60. This plate 59 carries flanges 61 which cooperate with the flanges on the housing 39 to form the desired sand or air seal.

The air chamber formed by the channel stretcher plate 57 and its top 59 has air ports 62 (Fig. 23) leading to the hollow stoker front 63. From this stoker front 63 air can leak through a passage 64 between the stoker front and the brick-work 56. Similar air leak passages 65 are provided between the face of the stoker front 63 and the back of the fire door 4, air coming from these leaks 64 and 65 going to assist the combustion at the lighting-up place on the grate. Orifices may further be provided leading to the space 66 beneath the stretcher plate 57, which space is closed by an air sealing plate 67 (see Fig. 1). An air pressure relief valve or valve controlled port 68 can be provided on the stretcher plate chamber 57.

Instead of passing air simultaneously into left and right hand jamb columns, it may for instance be taken up one column from the duct 53, into the stretcher plate 57 then into the furnace front 63, then back into the stretcher plate 57 on the other side and down the other jamb column and thence through a port or an automatic and adjustable valve into the outer air or to any other place where it may be needed for instance in the burning off chamber or other low pressure chamber of the grate.

It will be seen that the air passing downwards into the furnace through such leak passages such as 64 and 65 and the passage 43 on the fire door 4 and other like places will meet gases otherwise tending to flow out of the furnace and turn or baffle these backwards again into the furnace thereby preventing the hot flame from attaining the parts of the stoker apparatus, or from issuing from passages therein.

The rear sprocket or drum air chamber 27 will usually have a reduced air pressure therein as compared with the other chambers 23, 24, 25, 26, having only the pressure due to the leakage of air through the links themselves and through any small leakage that may occur through the abutting parts of the air seals. Air from this chamber may pass into a passage 69 between the dumping plate 70 and an air guiding plate 71 (Figs.

Figures 7, 8:
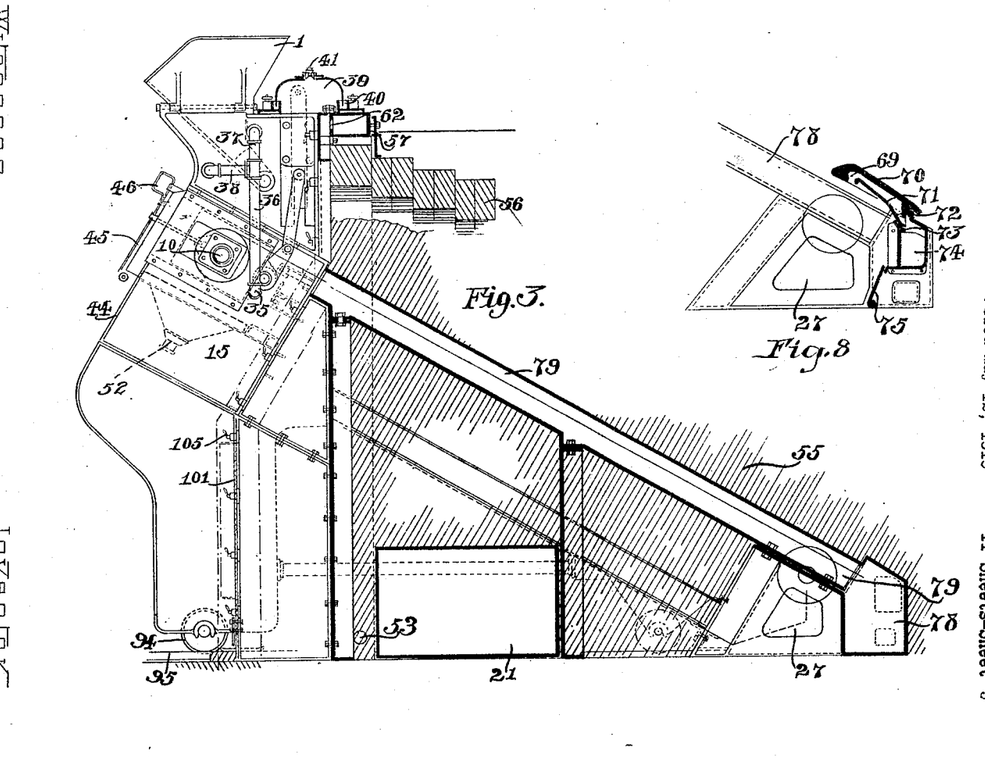
Figure 7 is a sectional plan through side frames and side walls of the grate, showing in sectional plan the dumping bars at rear of grate.
Figure 8 is a sectional side view of dumping bars at rear of grate together with the metal work supporting same.
Figure 7:
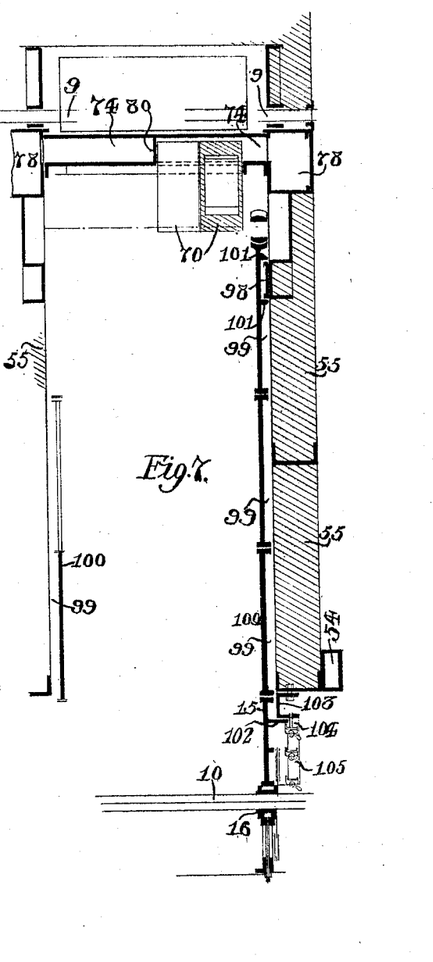
Figure 12:
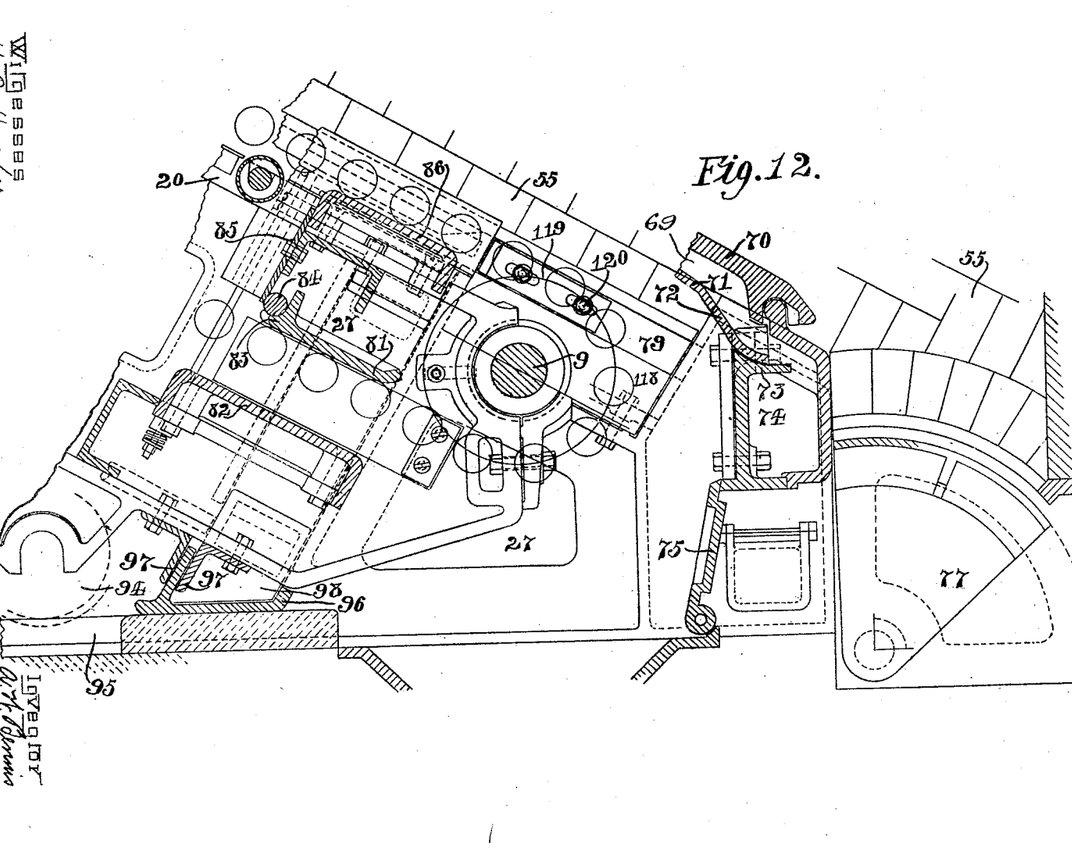
Figure 12 is a sectional side view through the rear end of the grate showing arrangements at the rear for air sealing also showing sectional view through rear of dumping bar and supporting metal work under same.

8 and 12). This plate 71 may be provided with a curved downward lip 72, fitting on an air guide plate 73 of the hollow dumping plate bearer 74.

The space below the hollow bearer 74 and the masonry or metal floor can be filled in with masonry or metal work, but is preferably provided as shown with a door or doors 75 (Fig. 9) hinged at the bottom, top or at its side or sides as found most convenient so as to form the rear wall of the chamber 27.

The ends of the hollow bearer 74 may be built into the masonry or can be bolted to the hollow air boxes 78 (Figs. 3 and 7) which may form a part of, or be attached to, the frames that carry the dumping valve 77.

Air from the air boxes 78 at the ends of the hollow bearer member 74 passes through the cill plates 79 of channel Z or other suitable section (Figs. 3 and 13) which are made hollow for the purpose. It is obvious, however, that the air for the cill plate may pass direct from the bearer 74. These cill plates extend longitudinally through the side walls 55 of the furnace to the front wall whence the air may finally be discharged into the open air or it may be led by a duct to the entrance of the fan, or the like means for producing a forced draught, so as to be used, after it has been warmed over again.

Instead of circulating the air from the rear chamber 27 as above described, it may be taken by a separate trunk from the main air supply direct to the cill plates 79 at one end of the grate and can then circulate out of one cill plate at one side of the grate through the hollow bearer member 74 into the chamber 27 then back through the dumping plate 70, through the hollow bearer member on the other side, which in this case will be provided with a diaphragm 80 at its middle (as shown in Fig. 7) and then back through the cill plate 79 on the opposite side of the grate whence it may be led into the open air or back into the fan as previously described.

Or again air may be blown down both cill plates 79 at the sides of the grate into the hollow bearer member 74 and then out into the chamber 27 under the dumping plate 70 in which case some leakage ports or orifices may if desired be provided below or adjacent to the hollow bearer 74.

The chamber 27 is sealed as to its front portions by a loose plate 81 (Fig. 12) adapted to slightly rise and fall with the movement of the links 5 and also by the lower dead plate 82 which is provided for sealing the chamber 27. The plate 82 is turned down at its rear end to prevent it catching the links and similarly the rear end of the plate 81 is turned up to prevent catching the links as they travel towards it.

The front end of plate 81 forms a support for a roller 84 which abuts against the channel cross member 85 connecting the side frames 76 so that the plate 81 may rise and fall without friction. This roller 84 will also act to a certain extent as a hinge to allow of complete freedom of movement to the plate 81. The chamber 27 is sealed as regards a portion of its upper part by a dead plate 86 over which the links slide. (See Fig. 23.)

The chambers 24, 25 and 26 are sealed at their front end by swinging plates 87 and by lower dead plates 88, the front swinging plate 87 for the chamber 24 acting as a rear sealing device for the chamber 23, the front end of which is sealed by a lower dead plate 90 and the roller 91, cooperating with the front channel cross piece 92, in a similar manner to the seal for the front of the back chamber 27 as above described. This more efficient seal than the swinging plates 87 is desirable as it does not matter much if air does leak from chamber 23 to chamber 24, chamber 24 to chamber 25, or chamber 25 to chamber 26 but it will be desirable to prevent as far as possible air leaking in any quantity from chamber 23 to chamber 22 or from chamber 26 to chamber 27.

Figure 9:
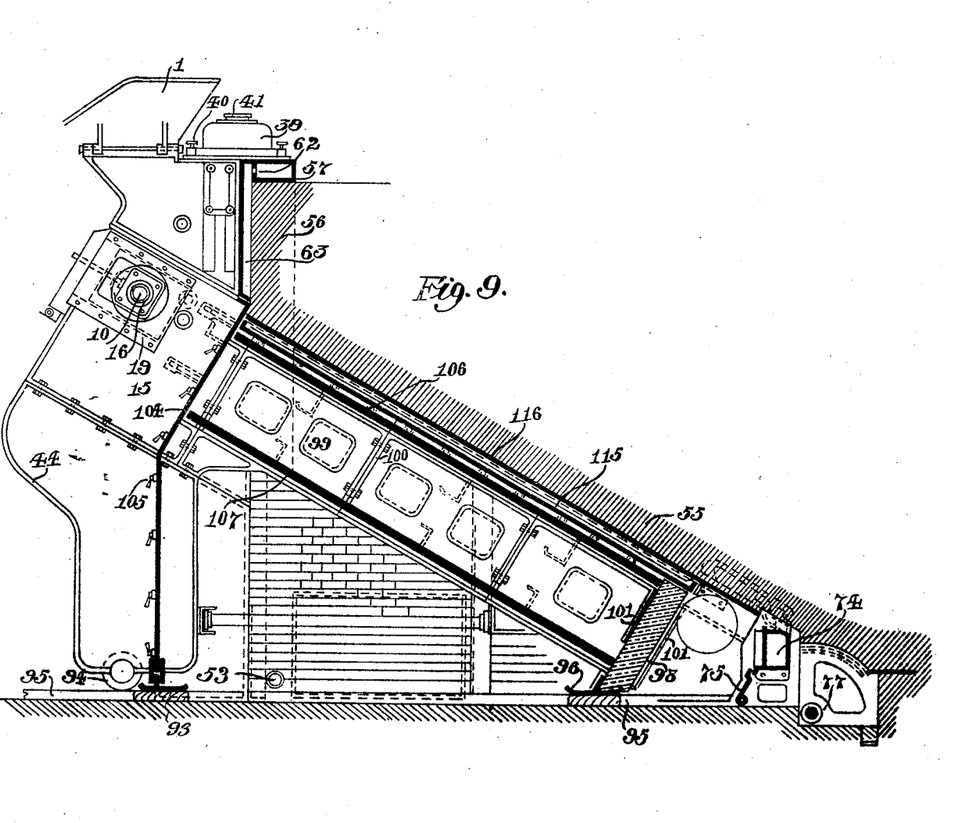
Figure 9 is a sectional side view through the space or spaces, situated between the side wall structure of the grate and the metal side frame of the grate.

The front of the main air chamber 22 beneath the grate is sealed by an angle plate 93 see Fig. 9 which is loose so that it may rest by its own weight upon the brick work, masonry or other abutment at the bottom of the furnace to allow the grate to be withdrawn in usual manner by the rollers 94 supporting it running on rails 95. The back of the main chamber may similarly be sealed by a shoe 96 (Fig. 12) engaging between a pair of angle irons 97 and which also is preferably loose on the bottom of the furnace.

Figure 13:
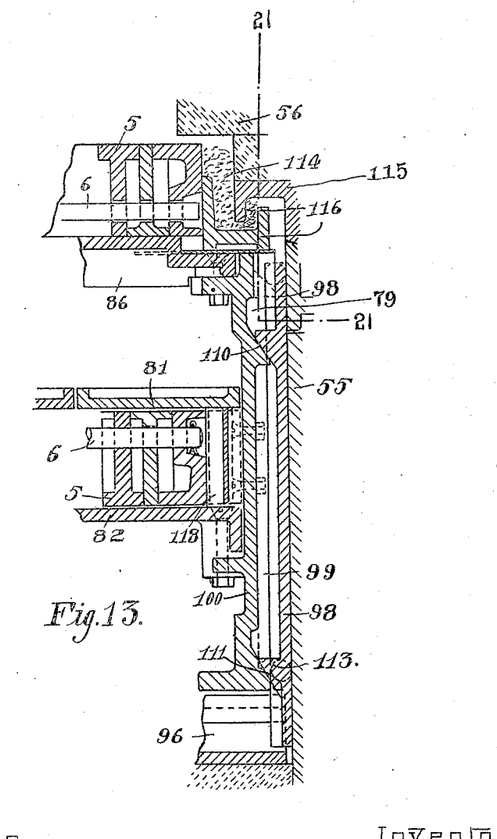
Figure 13 is a vertical cross section through metal side frame of grate at the line of the vertical air seal plate at side of frame and air seal at bottom of grate inclusive of a vertical cross section through the sand seal and of other portions of grate and side wall.
Figure 14:
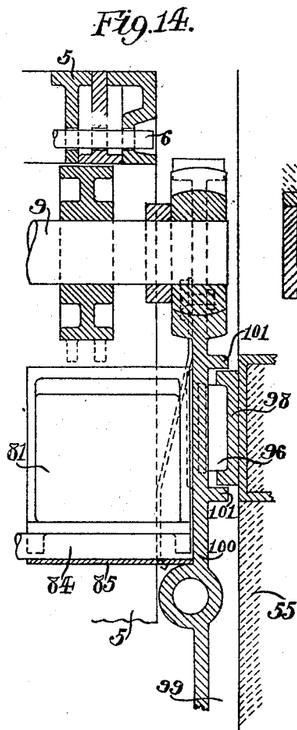
Figure 14 is a sectional plan through one side at rear end of grate.

The shoe 96 is adapted to receive at its sides the lower portion of a slidable sealing plate 98 (Figs. 7, 12 and 13) which is adapted to seal the rear end of a chamber 99 (Fig. 9) running along the side of the grate between the chain grate frame 100 and the brick work of the sides of the furnace 55. The sealing plate 98 moves between ribs 101 on the frame 100 (Figs. 7 and 14). The front end of this chamber 99 is sealed by a flange 102 (Fig. 7) abutting with the plate 103, the flange 102 being a part of, or connected with the frame 100. The front end of the chamber 99 is also completed by the plate 103 forming an extension of the wall 55 and also by a sealing strip 104 which is clamped by bolts 105 to the plate 103 and the flange 102.

The top and bottom of the chamber 99 are sealed by rollers 106, 107 operating between surfaces on the walls 55 and bevelled surfaces 108, 109 respectively on the longitudinal frame 100. This longitudinal frame 100 has further bevelled surfaces 110, 111 engaging with similar inclined surfaces on lugs 112, 113 respectively on the sealing plate 98 (Fig. 13).

Above the upper end of the chamber 99 a sand seal may be provided such as 114, which will seal the furnace along the side of the chain grate. This seal is formed between a channel member 115 and a flange 116 formed integral with part of the hollow cill plates 79.

Figure 15:
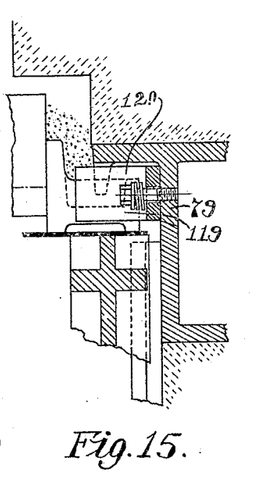
Fig. 15 is a cross sectional elevation showing the air seal at the rear end of the same.
Figure 16:
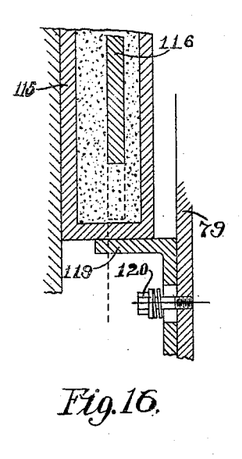
Fig. 16 is a sectional plan through said seal showing the air seal at the rear end of the same.

An angle plate 119 (Figs. 15 and 16) can be provided, secured elastically to the hollow cill plate 79 by a bolt and spring washer 120, this angle plate 119 bearing also against the end of the member 115 to seal the ends of the compartment. In this manner a plurality of compartments 99 separate from one another can be arranged along the run of the grate, in which different air pressures can be arranged, air passing from these compartments tending to baffle any tendency of the main heated air stream of the furnace or waste products of combustion from blowing down outwards through any sealing device.

Figure 17:
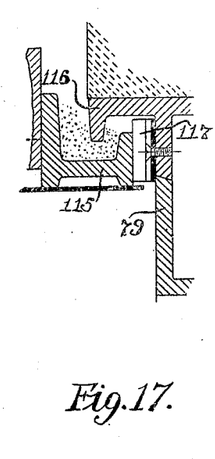
Fig. 17 is a cross sectional elevation showing the air seal between the outside face of the same and the side wall structure of the grate.
Figure 18:
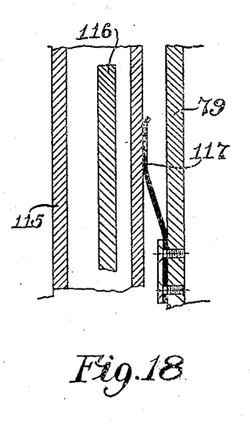
Fig. 18 is a sectional plan through the said seal showing the air seal between the outside face of the same and the side wall structure of the grate.
Figure 19:
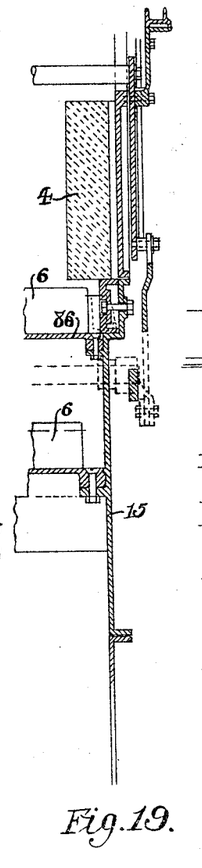
Figure 19 is a cross sectional detail view of the arrangements for operating the fire door also of other parts constituting the sides of the grate.
Figure 20:
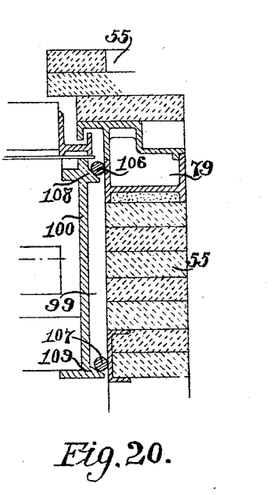
Figure 20 is a cross sectional view showing the chain grate frame at the side walls of the furnace showing also the air seals at the top and bottom of the chain grate frame.
Figure 21:
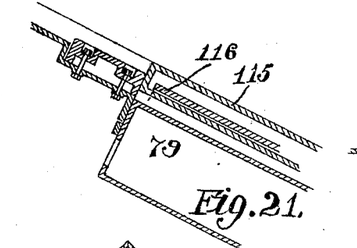
Figure 21 is a detail sectional view taken on the line 21—21 Figure 13 of the hollow cill plate, in relation to the sand seal at the side of the grate.
Figure 22:
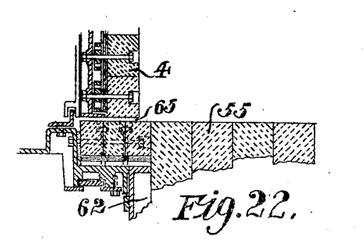
Figure 22 is a sectional detail of the fire door frame, in its relation to the side of the stoker frame.

It will be desirable to seal the sides of the links of the lower run of the grate in a similar manner as by a spring plate 117 (Figs. 17 and 18) secured to the side frame 100 to compensate for the expansion laterally of the links under continual heating and cooling.

It will thus be seen that the whole of the parts of the stoker which are subject to distortion from heat, except the dumping valve 77 which does not usually give trouble owing to the fact that nothing but dead clinker should be allowed to accumulate thereon, are air cooled under air pressure and the counter pressure therein or therearound will prevent any flame or hot gas from the furnace from traversing these parts.

Compressed air at a pressure above that of the atmosphere outside the furnace enters through the main air trunk 21 and then according to the position of the dampers will pass with varying pressure into the chambers 22, 23, 24, and thence through the interstices of the links to support combustion on the grate.

The air is also taken from this main trunk 21 through the opening 53 into the vertical columns 54, then through the stretcher plate 57, then into the hollow stoker front 63 when some of this air can leak into the furnace above the grate. The air from the hollow stoker front 63 can also pass down the cill plates 79 to the air box 78, then into the hollow bearer member 74 to leak into the furnace through the dumping plate.

What I claim is:—

1. A furnace, comprising in combination a mechanical stoking device, including a movable grate, means to force air into the furnace at joints between movable parts and fixed parts to seal the furnace at such places.

2. A furnace, comprising in combination a mechanical stoking device, including a movable grate, means to baffle the furnace flames by means of air forced from the outside of the furnace at joints between movable parts and fixed parts of the furnace.

3. A furnace, comprising in combination a mechanical stoking device, including a movable grate, means for forcing air into the furnace at joints between movable parts and fixed parts to seal the furnace at such places and to pass said air prior to entering into the furnace proper through hollow parts thereof to cool the same.

4. A furnace, comprising in combination a mechanical stoking device, including a movable grate, means for forcing air into the furnace at joints between the movable parts and fixed parts to seal the furnace at such places and to subsequently pass said air to assist in combustion on the grate.

5. A furnace, comprising in combination a mechanical stoking device, including a movable grate, means for forcing air into the furnace at joints between movable parts and fixed parts to seal the furnace at such places and to pass said air prior to entry into the furnace through the hollow parts thereof to cool the same, and means to subsequently pass the air to assist in combustion on the grate.

6. A furnace, comprising in combination a mechanical stoking device, including a movable grate, means for forcing air into the furnace at joints between movable parts and fixed parts to seal the furnace at such places and a relief valve to prevent excess gas pressure within the furnace.

7. A furnace, comprising in combination a mechanical stoking device, including a chain grate, sources of compressed air at various pressures along and under said grate, and means to force the air at such varying pressures into the furnace at places between movable and stationary parts to deflect the furnace flames therefrom.

8. A furnace, comprising in combination a mechanical stoking device, including a chain grate, sources of compressed air at various pressures along and under said grate, means to force in air at said varying pressures into the furnace at places between movable and stationary parts to deflect the furnace flames therefrom, and means whereby said air may be subsequently passed to assist in combustion on the grate.

9. A furnace, comprising in combination a mechanical stoking device, including a chain grate, compartments having air at various pressures along and under said grate, means to force in air at said varying pressures into the furnace at places between movable and stationary parts to deflect the furnace flames therefrom, and means to prevent leakage of air from one compartment to another.

10. A furnace, comprising in combination a mechanical stoking device, including a movable grate, means to pass air under pressure to the furnace grate to assist in combustion thereon, means to force air into the furnace at places between movable and stationary furnace parts, a hopper providing access for the fuel to the grate, means to normally seal said hopper to prevent air passage therethrough, by means of the fuel within it, an air pressure chamber at the front of said hopper, and a second air pressure chamber at the rear of said hopper, means to lead said air from said chambers to assist in combustion of the fuel from said hopper, a detachable cover for the chamber at the rear of said hopper, and an open channel seal for said cover, and a sealing medium within said channel seal.

11. A furnace, comprising in combination a mechanical stoking device, including a movable grate, means to pass air under pressure to the furnace grate to assist in combustion thereon, means to force air into the furnace at places between movable and stationary furnace parts, a hopper providing access for the fuel to the grate, means to normally seal said hopper to prevent air passage therethrough, by means of the fuel within it, an air pressure chamber in front of said hopper, and a second air pressure chamber at the rear of said hopper, means to lead air from said chambers to assist in combustion of the fuel from said hopper, a detachable cover for the chamber at the rear of said hopper, an open channel seal for said cover, a sealing medium within said channel seal, and a pressure relief valve on said cover to prevent an unpredetermined rising pressure in said second chamber.

12. A furnace, comprising in combination a mechanical stoking device, including a movable grate, a hollow furnace frame, supporting said grate, hollow cill plates among the furnace, a dumper plate at the rear of said movable grate, a hollow back-rest for said dumper plate, a hollow fire door over the front end of said movable grate, and means to pass air through said furnace frame, cill plates, hollow back-rest, and hollow fire door to cool the same, and means to subsequently pass said air to assist in combustion on said grate.

13. A furnace, comprising in combination a mechanical stoking device, including a movable grate, means to pass air under pressure to the furnace grate to assist in combustion thereon, means to force air into the furnace at places between movable and stationary parts, side frames supporting said movable grate in spaced relationship with the walls of the furnace, means to lead air under pressure into the space between said frames and said side walls, bevelled flanges at the top and bottom edges of said side frames, and sealing rollers engaging the side walls of the furnace and said bevelled flanges.

14. A furnace, comprising in combination a mechanical stoking device, including a movable grate, means to pass air under pressure to the furnace grate to assist in combustion thereon, means to force air into the furnace at places between movable and stationary parts, side frames supporting said movable grate in spaced relationship with the walls of the furnace, means to lead air under pressure into the space between said frames and said side walls, and flexible sealing means engaging the side bars of the movable grate to prevent air leakage at those places and to maintain an effective seal irrespective of motion of the grate relatively to the furnace frame.

In witness whereof, I have hereunto signed my name this 24th day of December, 1918.

ALFRED WILLIAM BENNIS.